US012613251B2

(12) United States Patent
Schmitt et al.

(10) Patent No.: US 12,613,251 B2
(45) Date of Patent: Apr. 28, 2026

(54) LABORATORY CONTAINER STORAGE SYSTEM

(71) Applicant: Roche Diagnostics Operations, Inc., Indianapolis, IN (US)

(72) Inventors: Norbert Schmitt, Lucerne (CH); Chris Steinert, Lucerne (CH)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 1052 days.

(21) Appl. No.: 17/239,771

(22) Filed: Apr. 26, 2021

(65) Prior Publication Data

US 2021/0341505 A1     Nov. 4, 2021

(30) Foreign Application Priority Data

Apr. 30, 2020    (EP) ..................................... 20172225

(51) Int. Cl.
| | |
|---|---|
| *G01N 35/04* | (2006.01) |
| *B65G 43/00* | (2006.01) |
| *B65G 54/02* | (2006.01) |

(52) U.S. Cl.
CPC ............. *G01N 35/04* (2013.01); *B65G 43/00* (2013.01); *B65G 54/02* (2013.01); *B65G 2201/0235* (2013.01); *G01N 2035/0477* (2013.01)

(58) Field of Classification Search
CPC ........... G01N 35/04; G01N 2035/0477; G01N 2035/0406; G01N 2035/0413;

(Continued)

(56) References Cited

U.S. PATENT DOCUMENTS

| | | | |
|---|---|---|---|
| 2011/0185826 A1* | 8/2011 | Norell ..................... | B29C 57/10 |
| | | | 264/296 |
| 2017/0059599 A1* | 3/2017 | Riether .................. | G01N 35/04 |

(Continued)

FOREIGN PATENT DOCUMENTS

| | | |
|---|---|---|
| CN | 207866714 U | 9/2018 |
| CN | 209807616 U | 12/2019 |

(Continued)

*Primary Examiner* — Elizabeth A Robinson
*Assistant Examiner* — Sophia Y Lyle
(74) *Attorney, Agent, or Firm* — Woodard, Emhardt, Henry, Reeves & Wagner, LLP

(57) ABSTRACT

The present disclosure relates to a laboratory container storage system, a laboratory system comprising the laboratory container storage system, and a method of operating the laboratory system. The laboratory container storage system comprising one or more laboratory container storage devices. Each laboratory container storage device comprises a frame and a storage element comprising a holder configured to receive and release a laboratory container horizontally and to hold the laboratory container in a suspended position above a horizontal surface. The storage element is mounted movably on the frame and configured to be moved between a first transfer position and a storage position and between the storage position and a second transfer position. In the first and second transfer position, the holder is positioned to receive or release the laboratory container horizontally. The storage position is located between the first and second transfer position.

24 Claims, 7 Drawing Sheets

(58) Field of Classification Search
CPC ... G01N 2035/0462; G01N 2035/0465; G01N
2035/0498; B65G 43/00; B65G 54/02;
B65G 2201/0235; B65G 1/06; B65G
1/10; B65G 1/127
See application file for complete search history.

(56)                   References Cited

U.S. PATENT DOCUMENTS

| | | | | |
|---|---|---|---|---|
| 2017/0183113 A1* | 6/2017 | Deutschle | .............. | G01G 17/06 |
| 2019/0101558 A1* | 4/2019 | Kinugawa | ........ | G01N 35/00584 |

FOREIGN PATENT DOCUMENTS

| | | | |
|---|---|---|---|
| EP | 2988134 | A1 | 2/2016 |
| EP | 2566787 | B1 | 3/2016 |
| EP | 3139175 | A1 | 3/2017 |
| EP | 3070479 | B1 | 7/2019 |
| JP | H09274046 | | 10/1997 |
| JP | 2001354207 | | 12/2001 |
| JP | 2013238486 | | 11/2013 |
| JP | 2015014572 | | 1/2015 |
| JP | 2016029347 | | 3/2016 |
| JP | 2019505812 | | 2/2019 |
| WO | 2014/144825 | A2 | 9/2014 |
| WO | WO 2019235172 | | 12/2019 |

* cited by examiner

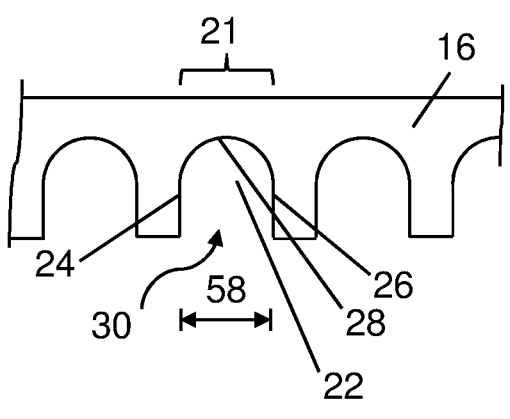
FIG. 3A
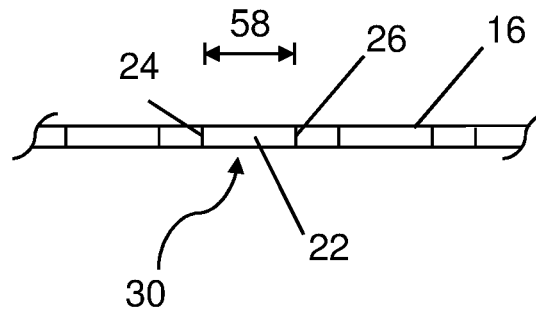
FIG. 3B
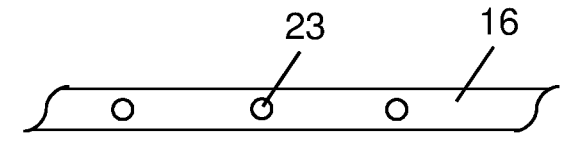
FIG. 3D
FIG. 3E
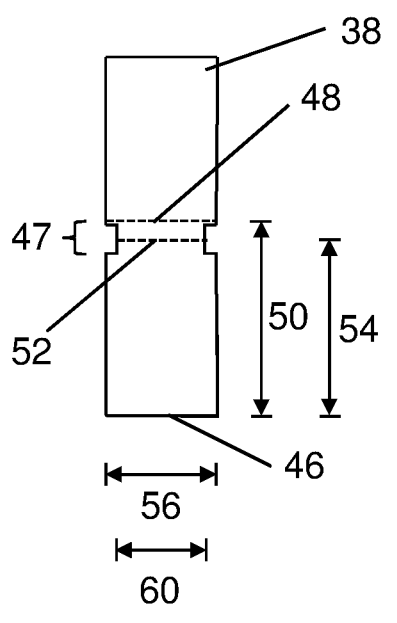
FIG. 3C
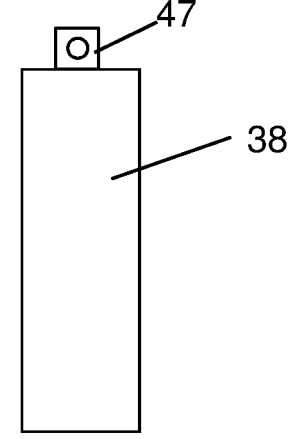
FIG. 3F

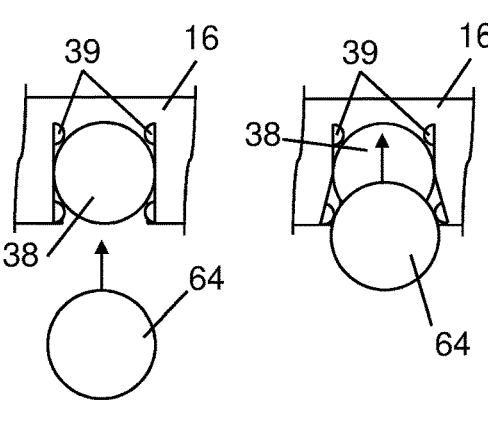
FIG. 4A
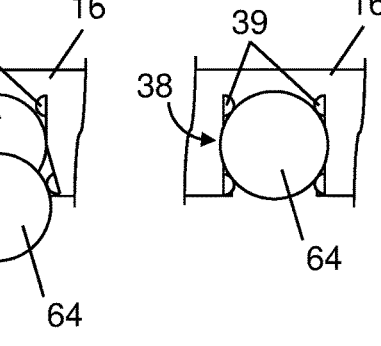
FIG. 4B
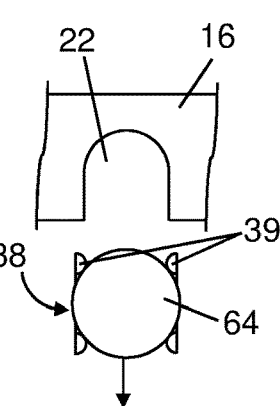
FIG. 4C
FIG. 4D
FIG. 4E
FIG. 4F
FIG. 4G
FIG. 4H
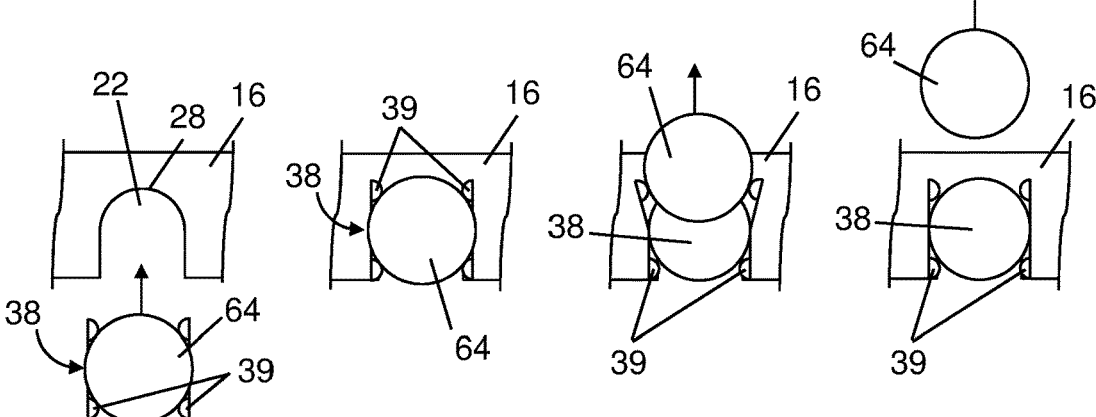
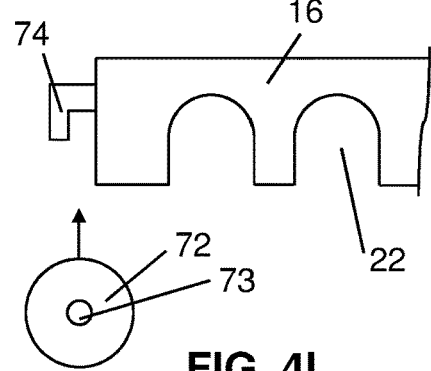
FIG. 4I
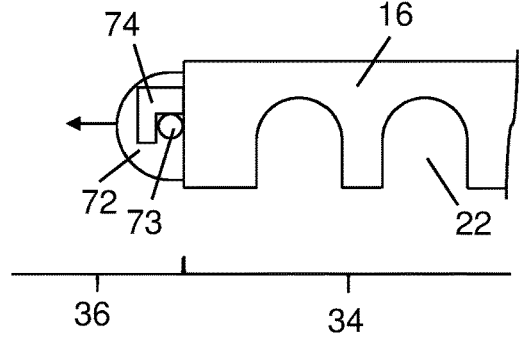
FIG. 4J
FIG. 4K

FIG. 6

LABORATORY CONTAINER STORAGE SYSTEM

CROSS-REFERENCE TO RELATED APPLICATIONS

This application claims priority to EP 20172225.3, filed Apr. 30, 2020, which is hereby incorporated by reference.

BACKGROUND

The present disclosure generally relates to automated in-vitro diagnostic laboratory testing.

In diagnostic laboratory systems, laboratory containers like test reagent containers, test sample containers, or laboratory consumable containers are transported between multiple stations such as pre-analytical, analytical and post-analytical stations according to predefined laboratory workflows in order to produce accurate and reliable test results, which represent pivotal information for physicians.

Typically, such laboratory containers are transported in laboratory container carriers. In fully automated diagnostic laboratory systems, the laboratory container carriers move on a transport surface of a transport system in order to distribute the laboratory containers to connected pre-analytical, analytical and post-analytical stations, which can conduct different test sample processing steps like preparing, analysing, or archiving of test samples.

Usually, diagnostic laboratory systems comprise laboratory container storage systems for storing laboratory containers under predefined conditions and for retrieving laboratory containers if further test sample processing steps like additional tests or analysis of test samples are required.

Therefore, there is a need to store laboratory containers in a simple and cost-efficient way to better serving the needs of automated in-vitro diagnostic laboratory testing.

SUMMARY

According to the present disclosure, a laboratory container storage system comprising one or more laboratory container storage devices is presented. Each laboratory container storage device can comprise a frame and a storage element comprising a holder configured to receive and release a laboratory container horizontally and to hold the laboratory container in a suspended position above a substantially horizontal surface. The storage element can be mounted movably on the frame and configured to be moved between a first transfer position and a storage position and between the storage position and a second transfer position. In the first and second transfer position, the holder can be positioned to receive or release the laboratory container horizontally. The storage position can be located between the first and second transfer position.

In accordance with one embodiment of the present disclosure, a laboratory system is also presented. The laboratory system can comprise a laboratory container storage system as described herein, a laboratory container carrier configured for coupling, holding, transporting, and decoupling the laboratory container, and a transport system comprising a substantially horizontal surface. The horizontal surface can be a transport surface and the laboratory container carrier can be configured to move on the transport surface. The laboratory container storage system can be arranged adjacent to the transport system. In the second transfer position, the holder can be positioned above the transport surface so that a laboratory container carrier can be positioned below the held laboratory container for coupling and/or decoupling the held laboratory container.

In accordance with another embodiment of the present disclosure, a method of operating a laboratory system as described herein. The method can comprise moving the storage element to the first transfer position, loading the holder of the storage element with the laboratory container, moving the storage element to the storage position, moving the storage element to the second transfer position so that the laboratory container can be held in a suspended position above the transport surface, moving the laboratory container carrier under the laboratory container, coupling the laboratory container to the laboratory container carrier, and moving the laboratory container carrier away from the holder and releasing the laboratory container from the holder.

Accordingly, it is a feature of the embodiments of the present disclosure to store laboratory containers in a simple and cost-efficient way to better serving the needs of automated in-vitro diagnostic laboratory testing. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIGS. 3A-3F illustrate two embodiments of a holder and holding portions according to an embodiment of the present disclosure.

FIGS. 4A-4K illustrate coupling/decoupling a laboratory container to/from a laboratory container carrier and coupling/decoupling a storage element to/from a positioning carrier according to an embodiment of the present disclosure.

FIG. 6 illustrates a schematic side view of a laboratory container storage system according to another embodiment of the present disclosure.

DETAILED DESCRIPTION

Figure 1:
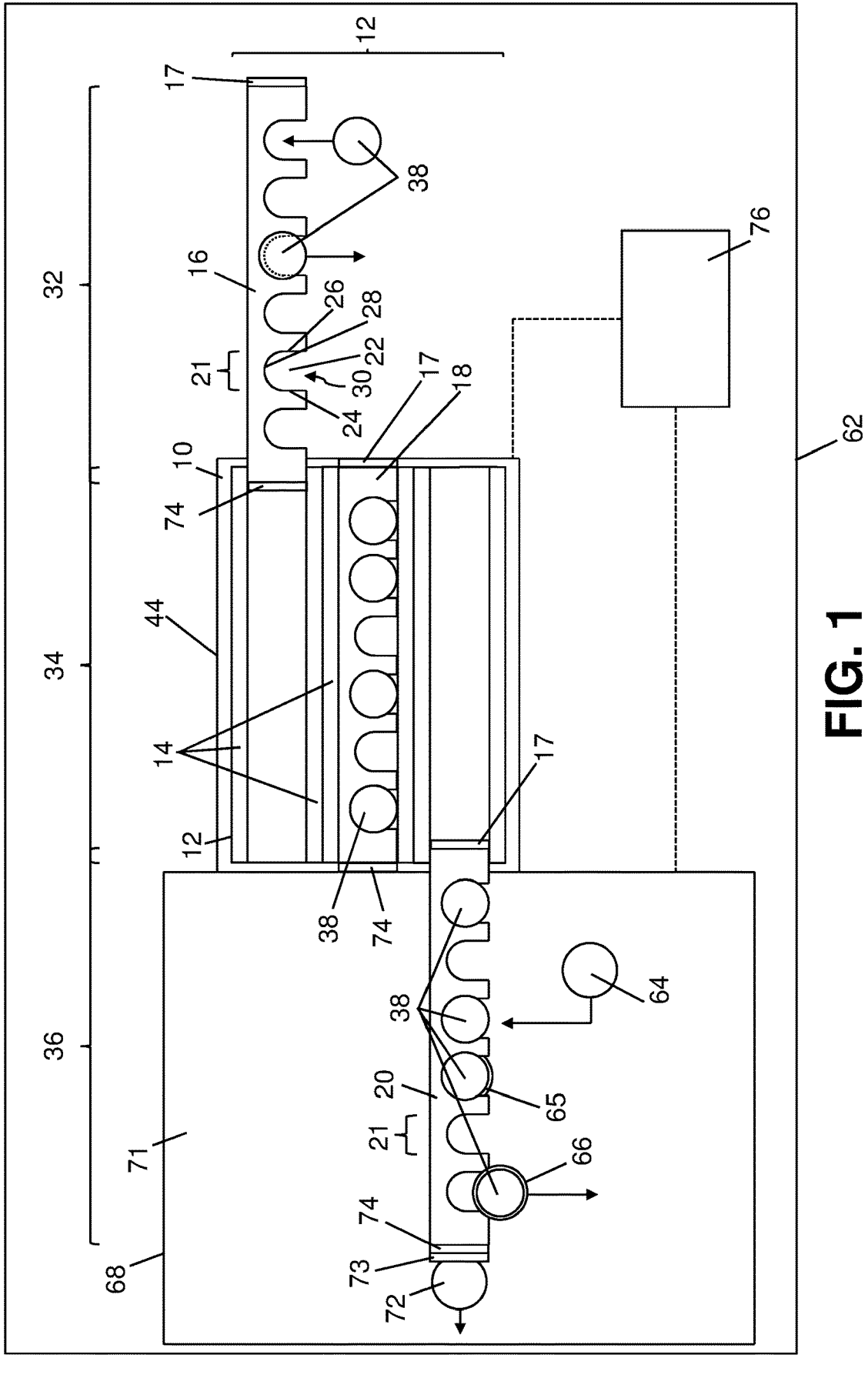
FIG. 1 illustrates a schematic top view of a laboratory system comprising a laboratory container storage system, laboratory containers, laboratory container carriers, and a transport system according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The present disclosure relates to a laboratory container storage system comprising one or more laboratory container storage devices. Each laboratory container storage device can comprise a frame and a storage element comprising a holder configured to receive and release a laboratory container substantially horizontally and to hold the laboratory container in a suspended position above a horizontal surface. The storage element can be mounted movably on the frame and configured to be moved between a first transfer position and a storage position and between the storage position and a second transfer position. In the first and second transfer position, the holder can be positioned to receive or release the laboratory container horizontally. The storage position can be located between the first and second transfer position As used herein, the term "laboratory container" can relate to a device configured to receive, store, transport, and/or release a content such as a test reagent (e.g., reagent for a histological test, a immunochemistry test, a clinical chemistry test, a coagulation test, a hematological test, or a molecular biological test, and the like), a test sample (e.g., tissue, blood, urine, serum, plasma, or liquefied biopsy sample, and the like), a laboratory consumable (e.g., pipette tip, cuvette, glass slide, micro-well plate, and the like). Thus, the laboratory container may be a test reagent container, test sample container, or a laboratory consumable container. Depending on the content of the laboratory container, test sample processing steps, and manufacturer of the material as well as the dimension of the laboratory container such as, for example, diameter, side length, height and geometry may vary.

As used herein, the term "laboratory container storage system" can relate to a laboratory device for handling test reagents, test samples, and consumables in the context of receiving, storing, releasing or retrieving them. In one embodiment, the laboratory container storage system can comprise a housing for protecting test reagents, test samples, or consumables from environmental factors such as temperature, humidity, or dirt. The storage position can be located within the housing and the first and second transfer position can be located outside of the housing so that test reagents, test samples, and consumables can be stored under predefined and controlled storing conditions. In one embodiment, the laboratory container storage system can comprise a tempering unit to hold a defined temperature range within the housing.

In one embodiment, the first transfer position, the storage position, and the second transfer position can be adjacently arranged in a straight line. Thus, the first transfer position can be on one side of the storage position and the second transfer position can be on the opposite side of the storage position. Accordingly, test reagents, test samples, or consumables can be loaded and released/retrieved from two opposite sides of the laboratory container storage system.

In one embodiment, the frame can comprise a guiding element on which the storage element can be connected movably. The guiding element can be configured to guide the movement of the storage element between the storage position and the transfer positions. In a more specific embodiment, the guiding element can be linear.

In one embodiment, the storage element can comprise a handle so that the storage element can be moved manually between the storage position and the first transfer position. Thus, an operator can move the storage element from the storage position to the first transfer position for loading laboratory containers. After loading the laboratory containers, the operator can move the storage element back to the storage position for storing the laboratory containers.

Alternatively, the laboratory container storage system can comprise an actuator for moving the storage element between the storage position and the first transfer position. The actuator may be further configured for moving the storage element between the storage position and the second transfer position.

The storage element can comprise a holder configured to receive and release a laboratory container substantially horizontally and to hold the laboratory container in a suspended position above a substantially horizontal surface. In one embodiment, the holder can be a substantially horizontal holding slot as further described below. In an alternative embodiment, the holder can be a substantially horizontal holding rod. In a further alternative embodiment, the holder can be a magnet. In a further alternative embodiment, the holder can be a latch-fit or snap-latch.

As used herein, the term "suspended position" can relate to a position of a held laboratory container relative to a substantially horizontal surface so that the bottom of the laboratory container may not be in direct contact with the horizontal surface. Thus, the laboratory container can be hanging above the horizontal surface. Depending on the position of the storage element, the horizontal surface as well as its distance to the laboratory container may change. For example, in the first transfer position, the horizontal surface can be a floor or a working table. In the storage position, the horizontal surface can be the bottom of the laboratory container storage system or the top of a further laboratory container held in a further storage element of a further laboratory container storage device located below the laboratory container storage device. In the second transfer position, the horizontal surface can be a transport surface of a transport system as further described below.

In one embodiment, the holder can comprise a substantially horizontal holding slot with two opposing side edges, a rear edge, and an open side. The two opposing side edges can be configured to hold a laboratory container and the open side can be configured to receive or release the laboratory container horizontally. In one embodiment, the distance between the two opposing edges, the width of the rear edge, and the width of the open side can have the same length. In another embodiment, the rear edge can have a substantially U-shaped form.

In one embodiment, the storage element can comprise multiple substantially horizontal holding slots arranged side by side in a substantially straight line. Thus, the storage element can be configured to receive, hold, and release multiple laboratory containers at the same time. Accordingly, the storage capacity of a storage element can be improved. For example, the storage element can comprise six horizontal holding slots for receiving, holding, and releasing six laboratory containers. In one embodiment, the open side of each horizontal holding slot can be oriented in the same direction. Thus, multiple laboratory containers can be loaded or retrieved from the same side. In an alternative embodiment, the open sides of two neighboring horizontal holding slots can be oriented in two opposite directions. Accordingly, multiple laboratory containers can be loaded or retrieved from two opposing sides of the storage element.

In one embodiment, the storage element can comprise a first group of horizontal holding slots and a second group of horizontal holding slots. The first group of horizontal holding slots can be arranged side by side in a first straight line and the open side of each horizontal holding slot of the first group can be oriented in the same direction. The second group of horizontal holding slots can be arranged side by side in a second straight line and the open side of each horizontal holding slot of the second group can be oriented in the same direction. The first and the second straight line can be substantially parallel to each other. In addition, the open sides of the first group of horizontal holding slots and the open sides of the second group of horizontal holding slots can be oriented in two opposite directions. Accordingly, the storage capacity of a storage element can be further improved and multiple laboratory containers can be loaded or retrieved from two opposing sides of the storage element.

In one embodiment, the laboratory container storage device can comprise multiple storage elements arranged side by side in parallel and movably mounted on the frame. Each storage element can be moved individually. Accordingly, laboratory containers can be loaded on and/or retrieved from individual storage elements. Furthermore, the storage capacity of the laboratory container storage device can be further improved.

In one embodiment, the laboratory container storage system can comprise at least two container storage devices. The at least two container storage devices can be arranged vertically spaced relative to each other. The laboratory container storage system can further comprise an elevating device. The at least two container storage devices can be mounted on the elevating device. The elevating device can be configured to move the at least two container storage devices up and down along a vertical axis. The at least two container storage devices can remain continuously horizontally aligned during the up and down movement. Thus, the elevating device can position each of the at least two container storage devices relative to a substantially horizontal surface so that a held laboratory can be positioned in a suspended position above the horizontal surface when the storage element is in the second transfer position. In one embodiment, the elevating device can be an elevator.

In another embodiment, the laboratory container storage system can comprise at least two container storage devices. The at least two container storage devices can be arranged vertically and/or horizontally spaced relative to each other. The laboratory container storage system can further comprise a circulating device. The at least two container storage devices can be mounted on the circulating device. The circulating device can be configured to circulate horizontally and vertically the at least two container storage devices along a circulation path. The at least two container storage devices can remain continuously horizontally aligned during the circulating movement. The circulating device can position each of the at least two container storage devices relative to a horizontal surface so that a held laboratory container can be positioned in a suspended position above the horizontal surface when the storage element is in the second transfer position. In one embodiment, the circulating device can be a paternoster elevator.

In one embodiment, the laboratory container storage system can further comprise a laboratory container comprising a holding portion configured to engage with/disengage from the holder or to couple to/decouple from the holder.

In one embodiment, the holder can be a substantially horizontal rod and the holding portion can comprise a hook or hole configured to engage with/disengage from the horizontal rod.

In another embodiment, the holder can comprise a magnet and the holding portion can comprise a magnetic surface configured to couple to/decouple from the holder.

In another embodiment, the holder can comprise latch-fit or snap-latch and the holding portion can comprise a corresponding counter snap-latch or latch-fit configured to couple to/decouple from the holding means.

In another embodiment, the holder can be a substantially horizontal holding slot and the holding portion can comprise a shape or geometric form of the laboratory container configured to engage with/disengage from the horizontal holding slot.

In another embodiment, the laboratory container can comprise a bottom and a first horizontal cross section, which can be at a first height from the bottom. The holding portion can comprise a second horizontal cross section, which can be at a second height from the bottom. The first height can be greater than the second height. The width of the first horizontal cross section can be greater than the distance between the two opposing edges. The width of the second horizontal cross section can be the same or lesser than the distance between the two opposing edges. Accordingly, the holding portion of the laboratory container can engage with the two opposing edges for holding the laboratory container in a suspended position above a horizontal surface.

For example, the laboratory container can be a cylindrical or cubic form and the holding portion can comprise a continuous notch of the sidewall so that the laboratory container can engage with/disengage from the two opposing edges of the horizontal holding slot. Alternatively, the laboratory container can have a conic form so that the laboratory container can engage with/disengage from the two opposing edges of the horizontal holding slot.

The present disclosure can also relate to a laboratory system comprising a laboratory container storage system as described herein, a laboratory container carrier configured for coupling, holding, transporting, and decoupling the laboratory container, and a transport system comprising a substantially horizontal surface. The horizontal surface can be a transport surface and the laboratory container carrier can be configured to move on the transport surface. The laboratory container storage system can be arranged adjacent to the transport system. In the second transfer position, the holder can be positioned above the transport surface so that the laboratory container carrier can be positioned below the held laboratory container for coupling and/or decoupling the held laboratory container.

As used herein, the term "laboratory container carrier" can relate to a device configured for coupling, holding, transporting, and decoupling a laboratory container on a transport surface. For transporting or moving the laboratory container, the laboratory container can be coupled to the laboratory container carrier. Thus, after coupling the laboratory container, the laboratory container carrier can hold the laboratory container in order to move the laboratory container on the transport surface. For removing the laboratory container from the transport surface, the laboratory container can be decoupled from the laboratory container carrier at the holder and the laboratory container can be moved to the storage position by moving the storage element from the second transfer position to the storage position. Thus, only the laboratory container but not the laboratory container carrier can be stored in the laboratory container storage system. Accordingly, less space may be required in the laboratory container storage system. Furthermore, no laboratory container carriers may be required for storing laboratory containers, which can also reduce weight and costs.

In one embodiment, the laboratory container and the laboratory container carrier can comprise a coupling mechanism configured to couple the laboratory container to the laboratory container carrier and to decouple the laboratory container from the laboratory container carrier.

In one embodiment, the coupling mechanism can comprise a magnet comprised by the laboratory container carrier and a magnetic surface comprised by the laboratory container bottom.

In another embodiment, the coupling mechanism can comprise a latch-fit and a snap-latch. The latch-fit or snap-latch can be comprised by the laboratory container. The corresponding counter snap-latch or latch-fit can be comprised by the laboratory container carrier.

In a further embodiment, the coupling mechanism can comprise clamps comprised by the laboratory container. The laboratory container carrier can comprise a shape or geometric form so that the clamps of the laboratory container can engage/disengage the laboratory container carrier.

In one embodiment, the laboratory container carrier can comprise at least one magnetically active device, which can interact with a magnetic field so that a magnetic force can be applied to the laboratory container carrier in order to move the laboratory container carrier on the transport surface. In a further embodiment, the carrier can further comprise a bottom plate on which the laboratory container carrier can slide over the transport surface of the laboratory transport system. A laboratory container carrier comprising at least one magnetically active device, which can interact with a magnetic field and a bottom plate for sliding over the transport surface is well known in the art and may be designed as described in EP2988134A1 or as described in EP3070479A1, both of which are hereby incorporated by reference.

In an alternative embodiment, the laboratory container carrier can be a self-propelled carrier comprising an actuator and wheels for actively moving on the transport surface.

In one embodiment, the laboratory container carrier can comprise a carrier height. In the second transfer position, the holding slot of the storage element can be positioned above the transport surface. The distance between the two opposing edges of the holding slot and the transport surface can comprise the first height of the laboratory container and the carrier height.

As used herein, the term "transport system" can relate to a system designed to transport or distribute laboratory containers to connected pre-analytical stations, analytical stations, or post-analytical stations of a diagnostic laboratory system. A pre-analytical station can usually be used for the preliminary processing of test samples or test sample containers. An analytical station can be designed, for example, to use a test sample or part of the test sample and a test reagent in order to produce a measurable signal, based on which it is possible to determine whether an analyte is present, and if desired in what concentration. A post-analytical station can be used for the post-processing of test samples or test sample vessels like the archiving of test samples or test sample vessels. Such pre-analytical stations, analytical stations, and post-analytical stations are well known in the art. In one embodiment, the post-analytical station can be a laboratory container storage system as described herein.

The transport system can comprise a transport surface on which laboratory container carriers can be transported or moved. The laboratory container carrier may move along transportation routes on the transport surface. As used herein, the term "transportation route" can relate to a path a laboratory container carrier moves from a starting position to a destination position on the transport surface. The laboratory container carrier may move directly from the starting position to the destination position or via one or more intermediate positions between the starting position and the destination position. In the latter case, the transportation route can define the order of intermediate positions the carrier passes on its path from the starting position to the destination position. Typically, the starting position, the destination position, and the one or more intermediate positions between the starting position and destination position can be located at connected pre-analytical stations, analytical stations, post-analytical stations, or laboratory container storage systems so that test sample processing steps according to predefined laboratory workflows can be conducted. For example, the starting position and the destination position may be located at a laboratory container storage system. The one or more intermediate positions between the starting position and destination position may be located at one or more connected analytical stations where test samples can be aspirated out of the test sample vessel for analysis of the test sample. Furthermore, the one or more intermediate positions may be located at dedicated areas on the transport surface for temporal placing or parking of laboratory container carriers (buffering areas).

In one embodiment, the transport system can comprise a number of electro-magnetic actuators stationary arranged below the transport surface and configured to generate magnetic fields to move the laboratory container carrier. The laboratory container carrier can comprise a magnetically active device, which can interact with the magnetic fields so that a magnetic force can be applied to the laboratory container carrier for moving the laboratory container carrier over the transport surface. Such a transport system is well known in the art and may be designed as described in EP2566787B1, which is hereby incorporated by reference.

In an alternative embodiment, the transport system can comprise a stable transport surface on which self-propelled laboratory container carriers can move.

In one embodiment, the laboratory system can further comprise a positioning carrier. The positioning carrier and the storage element can comprise a further coupling mechanism. The positioning carrier can be configured to couple to/decouple from the storage element or to engage with/disengage from the storage element. The positioning carrier can be further configured to move the storage element between the storage position and the second transfer position.

In one embodiment, the further coupling mechanism can comprise a first part comprised by the positioning carrier and a second part comprised by the storage element. The first and the second part can be configured to couple to/decouple from or to engage with/disengage from each other. In one embodiment, the first part can comprise a magnet and the second part can comprise a magnetic surface. In a further embodiment, the first part can comprise a latch-fit or snap-latch and the second part can comprise a corresponding counter snap-latch or latch-fit. In a further embodiment, the first part can comprise a vertical rod and the second part can be a hook.

In one embodiment, the positioning carrier can comprise at least one magnetically active device, which can interact with a magnetic field so that a magnetic force can be applied to the positioning carrier in order to move the positioning carrier on the transport surface. In an alternative embodiment, the positioning carrier can be a self-propelled carrier.

In an alternative embodiment, the laboratory container storage system can comprise an actuator for moving the storage element between the storage position and the second transfer position. The actuator may be further configured for moving the storage element between the storage position and first transfer position.

In one embodiment, the transport surface can comprise a linear edge and the laboratory container storage system can be configured to move along the linear edge. For example, the laboratory container storage system can be mounted movably on a further frame. The further frame can comprise a further guiding element substantially parallel to the linear edge. The laboratory container storage system can be movably connected on the further guiding element. The further guiding element can be configured to guide the movement of the laboratory container storage system along the linear edge of the transport surface by a further actuator.

In one embodiment, the laboratory system can further comprise a control unit communicatively connected to the laboratory container storage system and the transport system. The control unit can be configured to control the movement of the storage element between the first transfer position and the storage position and between the storage position and the second transfer position. The control unit can be further configured to control the movement of the laboratory container carrier on the transport surface. In one embodiment, the control unit can be further configured to control the movement of the positioning carrier.

In one embodiment, the control unit can be configured to activate the actuator for moving the storage element between the first transfer position and the storage position and/or between the storage position and the second transfer position. In another embodiment, the control unit can be configured to unlock a lock mechanism when the storage element is at the storage position so that the storage element can be moved manually between the storage position and the first position or the storage element can be moved by the positioning carrier between the storage position and the second transfer position.

In another embodiment, the control unit can be configured to activate the elevating or circulating device in order to position one of the at least two container storage devices relative to the transport surface of a transport system so that a held laboratory container can be held in a suspended position above the transport surface when the storage element is in the second transfer position.

In another embodiment, the control unit can be configured to activate the electro-magnetic actuators, for example, each of them individually, to apply the magnetic move force to the laboratory container carrier or positioning carrier such that the laboratory container carrier or positioning carrier can be moved.

The term "control unit" as used herein can encompass any physical or virtual processing device configurable to control the operation of the laboratory system as described herein. The control unit may, for instance, be embodied as a programmable logic controller configured to execute a computer-readable program provided with instructions to cause the laboratory system to execute the steps of the method as further described below. Furthermore, the control unit may be communicatively connected to a database comprising a laboratory container inventory of the laboratory container storage system. The laboratory container inventory can comprise information about the identity, content, and position of each stored laboratory container in the laboratory container storage system. The position information of a laboratory container may be determined by the storage element and holder, which can hold the laboratory container. This information can then be used to move a certain storage element from the storage position to the second position and to move a laboratory container carrier under a certain laboratory container when this certain laboratory container needs to be moved to a connected pre-analytical station or analytical station.

The present disclosure further relates to a method of operating a laboratory system as described herein. The method can comprises a) moving the storage element to the first transfer position, b) loading the holding means of the storage element with the laboratory container, c) moving the storage element to the storage position, d) moving the storage element to the second transfer position so that the laboratory container is held in a suspended position above the transport surface, e) moving the laboratory container carrier under the laboratory container, f) coupling the laboratory container to the laboratory container carrier, and g) moving the laboratory container carrier away from the holder and releasing the laboratory container from the holder.

In one embodiment, the storage element can be moved to the first transfer position by an actuator in step a). Alternatively, the storage element can be moved to the first transfer position manually.

In one embodiment of step b), the holder of the storage element can be loaded with the laboratory container by inserting the laboratory container into the holding slot through the open side manually or automated, e.g., by a robotic arm.

In one embodiment, the storage element can be moved to the storage position by an actuator in step c). Alternatively, the storage element can be moved to the storage position manually.

In one embodiment, the storage element can be moved to the second transfer position by an actuator in step d). In an alternative embodiment, the storage element can be moved to the second transfer position by a positioning carrier. The positioning carrier may be moved by the transport system or the positioning carrier may be a self-propelled carrier actively moving on the transport surface for moving the storage element between the storage position and second transfer position.

In one embodiment, the laboratory container carrier can be moved under the laboratory container by the transport system in step e). Alternatively, the positioning carrier can be a self-propelled carrier actively moving under the laboratory container.

In one embodiment, the laboratory container can be coupled to the laboratory container carrier by a coupling mechanism in step f). Thus, by moving the laboratory container carrier under the laboratory container, the coupling mechanism can couple the laboratory container to the laboratory container carrier.

In one embodiment, the laboratory container carrier can be moved away from the holder by the transport system for releasing the laboratory container from the holder in step g). Alternatively, the positioning carrier can be a self-propelled carrier actively moving away from the holder. For example, the laboratory container carrier can be moving in the direction of the open side for releasing the laboratory container from the holding slot.

In one embodiment, the method further comprises h) moving the laboratory container carrier towards the holder thereby loading the holder of the storage element with the laboratory container, i) decoupling the laboratory container from the laboratory container carrier, and j) moving the storage element to the storage position.

In one embodiment, the laboratory container carrier can be moved towards the holder by the transport system for loading the holder of the storage element with the laboratory container in step h). Alternatively, the laboratory container carrier can be a self-propelled carrier actively moving towards the holding means.

In one embodiment, decoupling the laboratory container from the laboratory container carrier in step i) can comprise further moving the laboratory container carrier in the same direction. By further moving the laboratory container carrier in the same direction, the coupling mechanism can decouple the laboratory container from the laboratory container carrier. The laboratory container carrier may be moved by the transport system. Alternatively, the laboratory container carrier can be a self-propelled carrier actively moving in the same direction.

In one embodiment, the storage element can be moved to the storage position by an actuator in step j). In an alternative embodiment, the storage element can be moved to the storage position by a positioning carrier. The positioning carrier may be moved by the transport system or the positioning carrier can be a self-propelled carrier actively on the transport surface.

Figure 2:
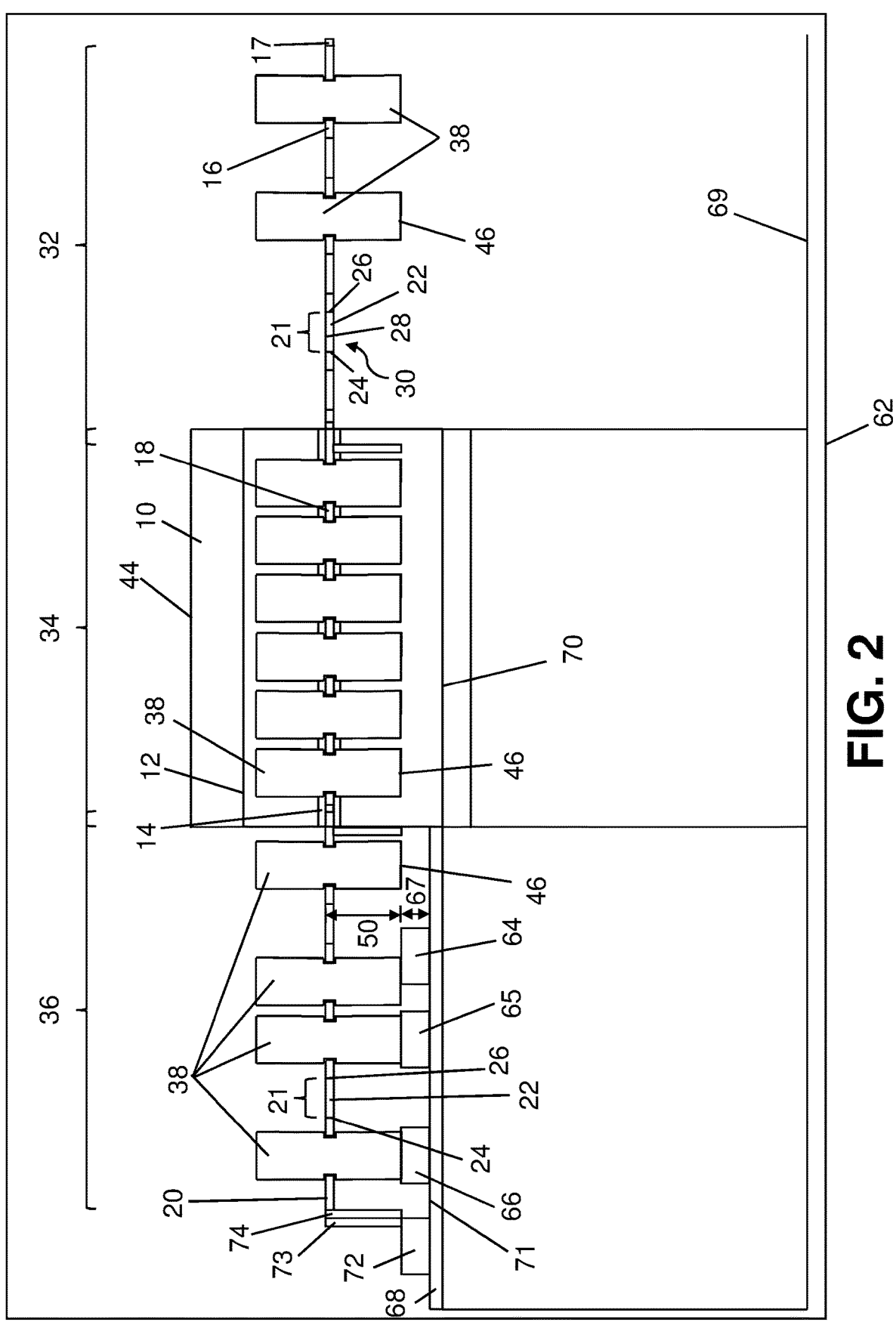
FIG. 2 illustrates a schematic side view of a laboratory system comprising a laboratory container storage system, laboratory containers, laboratory container carriers, and a transport system according to an embodiment of the present disclosure.

Referring initially to FIG. 1, FIG. 1 shows a schematic top view of an embodiment of a laboratory system (62) comprising a laboratory container storage system (10), laboratory containers (38), laboratory container carriers (64, 65, 66), and a transport system (68). The shown laboratory container storage system (10) can comprise one laboratory container storage device (12). The laboratory container storage device (12) can comprise a frame (14) and three storage elements (16, 18, 20) each comprising six holders (21) configured for receiving and releasing a laboratory container (38) horizontally and for holding the laboratory container in a suspended position above a horizontal surface (69, 70, 71) as shown in FIG. 2. The storage elements (16, 18, 20) can be mounted movably on the frame (14) and configured to be moved between a first transfer position (32) and a storage position (34) and between the storage position (34) and a second transfer position (36). As shown in FIG. 1, one storage element (16) can be in the first transfer position (32) where the six holders (21) can be positioned to receive or release the laboratory container (38) horizontally as indicated by arrows, e.g., by manual loading/unloading of the laboratory container storage system (10). One storage element (20) can be in the second transfer position (36) where the six holders (21) can be positioned to receive or release the laboratory container (38) horizontally by a laboratory container carrier (64, 65, 66). One storage element (18) can be in the storage position (34) which can be located between the first and second transfer position (32, 36). As further shown in FIG. 1, each storage element (16, 18, 20) can comprise a handle (17) so that the storage elements (16, 18, 20) can be moved manually between the storage position (34) and the first position (32). Alternatively, the laboratory container storage system (10) can comprise an actuator (not shown) for moving the storage elements (16, 18, 20) between the storage position (34) and the first position (32).

In the shown embodiment, the laboratory system (62) can further comprise a positioning carrier (72). The positioning carrier (72) and the storage element can comprise a further coupling mechanism (73, 74). The further coupling mechanism (73, 74) can comprise a first part (73) comprised by the positioning carrier (72) and a second part (74) comprised by the storage elements (16, 18, 20), wherein the first and the second part (73, 74) can be configured to couple to/decouple from or engage with/disengage from each other. Thus, the positioning carrier (72) can be configured to couple to/decouple from the storage element (16, 18, 20) or to engage with/disengage from the storage element (16, 18, 20).

In the shown embodiment, the first part (73) can comprise a magnet and the second part (74) can comprise a magnetic surface. The positioning carrier (72) can be further configured to move the storage elements (16, 18, 20) between the storage position (34) and the second transfer position (36). As shown in FIG. 1, the positioning carrier (72) can be moving away from the laboratory container storage system (10) for moving a storage element (20) from the storage position (34) to the second transfer position (36) as indicated by an arrow. Alternatively, the laboratory container storage system (10) can comprise an actuator (not shown) for moving the storage elements (16, 18, 20) between the storage position (34) and the second transfer positions (36).

The laboratory container storage system can comprise a housing (44) for protecting laboratory containers from environmental factors when the storage element (18) is in the storage position (34) which can be located within the housing (44). In the shown embodiment, the holder (21) can comprise a horizontal holding slot (22) with two opposing side edges (24, 26), a rear edge (28), and an open side (30). The two opposing side edges (24, 26) can be configured to hold a laboratory container (38) as further described in FIG. 3 and the open side (30) can be configured to receive and release the laboratory container (38) horizontally. The shown transport system (68) can comprise a horizontal surface (71) which can be a transport surface (71) of the transport system (68). The laboratory container carriers (64, 65, 66) can be configured to move on the transport surface (71).

As further shown in FIG. 1, the laboratory container storage system (10) can be arranged adjacent to the transport system (68). In the second transfer position (36), the holder (21) can be positioned above the transport surface (71) so that a laboratory container carrier (65) can be positioned below a held laboratory container (38) for coupling and/or decoupling the held laboratory container (38).

Three laboratory container carriers (64, 65, 66) are shown in FIG. 1. The first laboratory container carrier (64) can be moving towards a held laboratory container (38) as indicated by an arrow. The second laboratory container carrier (65) can be positioned right under a held laboratory container (38) where the laboratory container (38) is coupled to the laboratory container carrier (65) by a coupling mechanism. The coupling mechanism may comprise a magnet comprised by the laboratory container carrier (65) and a magnetic surface comprised by the laboratory container bottom (46) (not shown). An alternative embodiment of a coupling mechanism is shown in FIG. 4. As indicated by an arrow, the third laboratory container carrier (66) can be moving away from the holder (21) and thereby the laboratory container (38) can be released from the holder (21). The shown embodiment, the laboratory system (62) further can comprise a control unit (76) communicatively connected to the laboratory container storage system (10) and the transport system (68).

FIG. 2 depicts a schematic side view of the same laboratory system (62), laboratory container storage system (10), laboratory containers (38), laboratory container carriers (64, 65, 66), and transport system (68) as shown in FIG. 1. As shown in FIG. 2, each of the three storage elements (16, 18, 20) can comprise six holders (21) configured to receive and release a laboratory container (38) horizontally and to hold the laboratory container in a suspended position above a horizontal surface (69, 70, 71). Thus, the bottoms (46) of the laboratory containers (38) may not be in direct contact with the horizontal surfaces (69, 70, 71). Depending on the position of the storage elements (16, 18, 20), the horizontal surface (69, 70, 71) as well as the distance between the horizontal surface (69, 70, 71) and the laboratory containers (38) may change. In the shown embodiment, the horizontal surface can be a floor (69) when a storage element (16) is in the first transfer position (32). The horizontal surface can be a bottom (70) of the laboratory container storage system (10) when a storage element (18) is in the storage position (34). The horizontal surface can be the transport surface (71) of the transport system (68) when a storage element (20) is in the second transfer position (36). In the second transfer position (36), the holding slots (22) of the storage elements (20) can be positioned above the transport surface (71) so that a laboratory container carrier (65) can be positioned below a held laboratory container (38) for coupling and/or decoupling a held laboratory container (38) to a laboratory container carrier (65). For example, the distance between the two opposing edges (24, 26) of a holding slot (22) and the transport surface (71) can comprise a first height (50) of the laboratory container and a carrier height (67).

FIGS. 3A-F show two embodiments of holding portions (47) of laboratory containers (38) and corresponding holder (21) of the storage elements (16). As shown in FIGS. 3A-C, in a first embodiment, the holder (21) can be a horizontal holding slot (22) and the holding portion (47) can comprise a shape or geometric form of the laboratory container (38) configured to engage with/or disengage from the horizontal holding slot (22). FIG. 3A shows a top view of the horizontal holding slot (22) comprising two opposing side edges (24, 26), a rear edge (28), and an open side (30). The two opposing side edges (24, 26) can be configured to hold a laboratory container (38) by engaging with the holding portion (47) of the laboratory container (38). The open side (30) can be configured to receive or release the laboratory container (38) horizontally. FIG. 3B shows a side view of the same holder as shown in FIG. 3A. As shown in FIG. 3C, the laboratory container (38) can comprise a bottom (46) and a first horizontal cross section (48) which can be at a first height (50) from the bottom (46). The holding portion (47) can comprise a second horizontal cross section (52) which can be at a second height (54) from the bottom (46). The first height (50) can be greater than the second height (54). The width (56) of the first horizontal cross section (48) can be greater than the distance (58) between the two opposing edges (24, 26). The width (60) of the second horizontal cross section (52) can be the same or smaller than the distance (58) between the two opposing edges (24, 36). Accordingly, the holding portion (47) of the laboratory container (38) can engage with/disengage from the two opposing edges (24, 26) for holding/releasing the laboratory container (38).

FIGS. 3D and 3E show a top and side view of a second embodiment where the holder (21) is a horizontal rod (23). The corresponding holding portion (47) of the laboratory container (38) can comprise a hole configured to engage with/disengage from the horizontal rod (23) as shown in FIG. 3F.

FIGS. 4A-D show an embodiment of coupling a laboratory container (38) to a laboratory container carrier (64). FIGS. 4E-H show an embodiment of decoupling a laboratory container (38) from a laboratory container carrier (64). FIGS. 4I-K show an embodiment of coupling, moving, and decoupling a storage element (16) from a positioning carrier (72).

FIGS. 4A-D show a bottom view of a laboratory container (38), laboratory container carrier (64), and storage element (16). The laboratory container (38) can be held by a holding slot (22) of the storage element (16) and the laboratory container carrier (64) can be moving towards the laboratory container (38) as indicated by an arrow in FIG. 4A. The laboratory container (38) can comprise a coupling mechanism (39). In the shown embodiment, the coupling mechanism (39) can comprise clamps. The laboratory container carrier (64) can comprise a cylindrical shape with a round cross-section so that the clamps of the laboratory container (38) can engage the laboratory container carrier (64) when the laboratory container carrier (64) is moving under the laboratory container (38) as shown in FIG. 4B. In FIG. 4C, the laboratory container carrier (64) can be directly under the laboratory container (38) thereby the laboratory container can be coupled to the laboratory container carrier (64). For releasing the laboratory container (38) from the holding slot (22), the laboratory container (64) carrier can be moving away from the holding slot (22) as indicated by an arrow in FIG. 4D.

FIG. 4E-H show a bottom view of the laboratory container (38), laboratory container carrier (64), and storage element (16) as shown in FIG. 4A-D. As shown in FIG. 4E, the laboratory container carrier (64) to which the laboratory container (38) is coupled can be moving towards the holding slot (22) of the storage element (16) as indicated by an arrow. In FIG. 4F, the laboratory container carrier (64) can be directly under the holding slot (22) so that the laboratory container (38) is in the holding slot (22) of the storage element (16). The clamps of the coupling mechanism (39) of the laboratory container (38) can disengage the laboratory container carrier (64) when the laboratory container carrier (64) is further moving in the same direction as indicated by an arrow in FIG. 4G. As the laboratory container (38) is held back by the rear edge (28) of the holding slot (22), the laboratory container (38) can be decoupled from the laboratory container carrier (64) when the laboratory container carrier (64) is further moving in the same direction as indicated by an arrow in FIG. 4H.

FIG. 4I-K show a top view of a positioning carrier (72) and a storage element (16). The positioning carrier (72) and the storage element (16) can comprise a further coupling mechanism (73, 74). The further coupling mechanism can comprise a first part (73) comprised by the positioning carrier (72) and a second part (74) comprised by the storage element (38). In the shown embodiment, the first part (73) can comprise a vertical rod and the second part (74) can be a hook. The vertical rod can be configured to couple with the hook when the positioning carrier (72) is moving towards the hook as indicated by an arrow in FIG. 4I. After coupling, the positioning carrier (72) can further be configured to move the storage element (38) between the storage position (34) and the second transfer position (36). As indicated by an arrow in FIG. 4J, the positioning carrier (72) can be moving the storage element (38) from the storage position (34) to the second transfer position (36). For decoupling the positioning carrier (72) from the storage element (38), the positioning carrier is moving away from the hook as indicated by an arrow in FIG. 4K.

Figure 5:
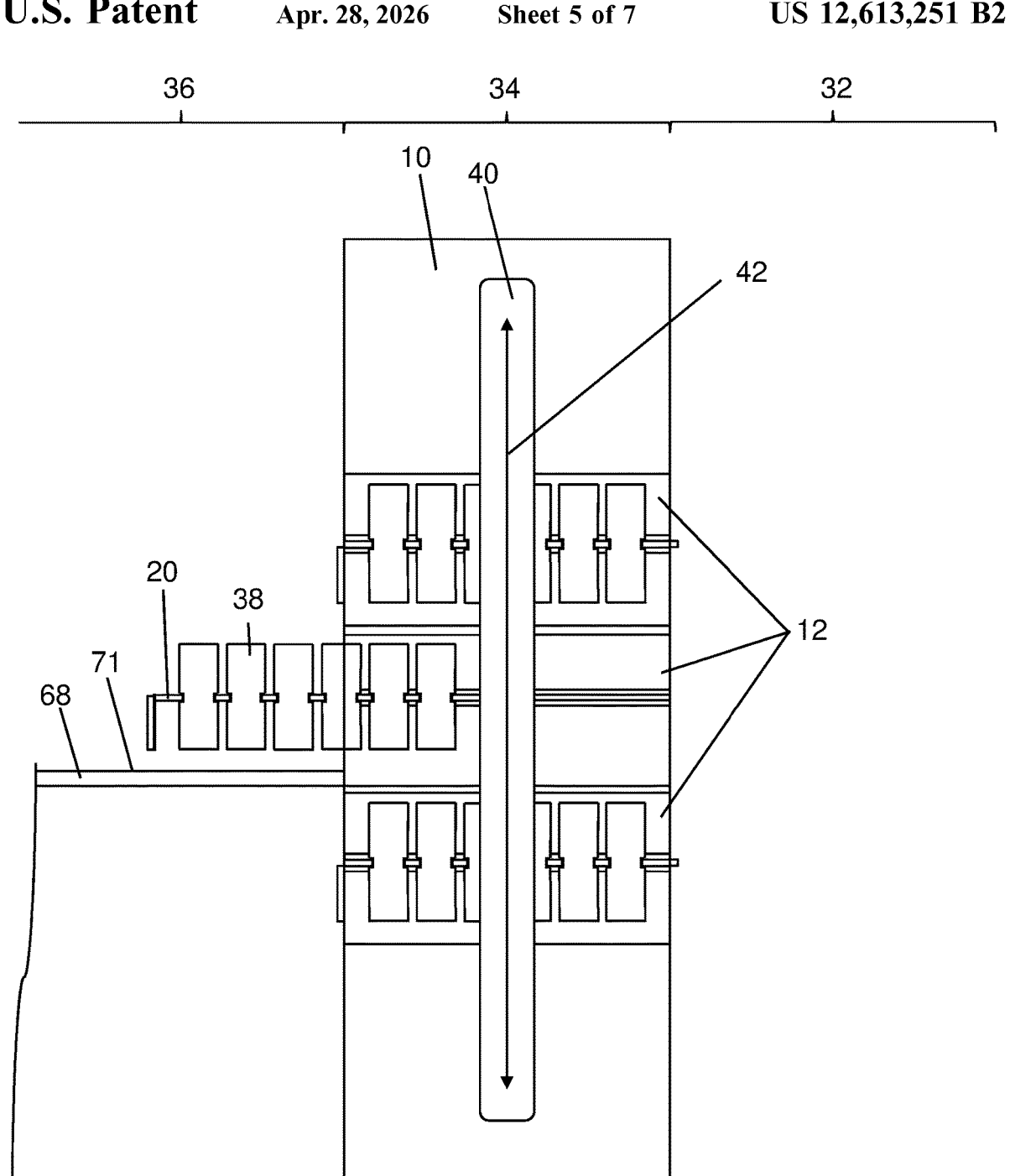
FIG. 5 illustrates a schematic side view of a laboratory container storage system according to another embodiment of the present disclosure.

FIG. 5 shows a schematic side view of a further embodiment of a laboratory container storage system (10). The shown laboratory container storage system (10) can comprise three container storage devices (12). The three container storage devices (12) can be arranged vertically spaced relative to each other. The laboratory container storage system (10) can further comprise an elevating device (40) on which the three container storage devices (12) can be mounted. The elevating device (40) can be configured to move the three container storage devices (12) up and down along a vertical axis (42) as indicated by an arrow. During the up and down movement, the three container storage devices (12) can remain continuously horizontally aligned. As further shown in FIG. 5, the elevating device (40) can position each of the three two container storage devices (12) relative to the transport surface (71) of the transport system (68) so that a laboratory container (38) can be held in a suspended position above the transport surface (71). In the shown example, a part of the storage element (20) of the middle container storage device of the three shown container storage devices (12) can be in the second transfer position (36).

Figure 6:
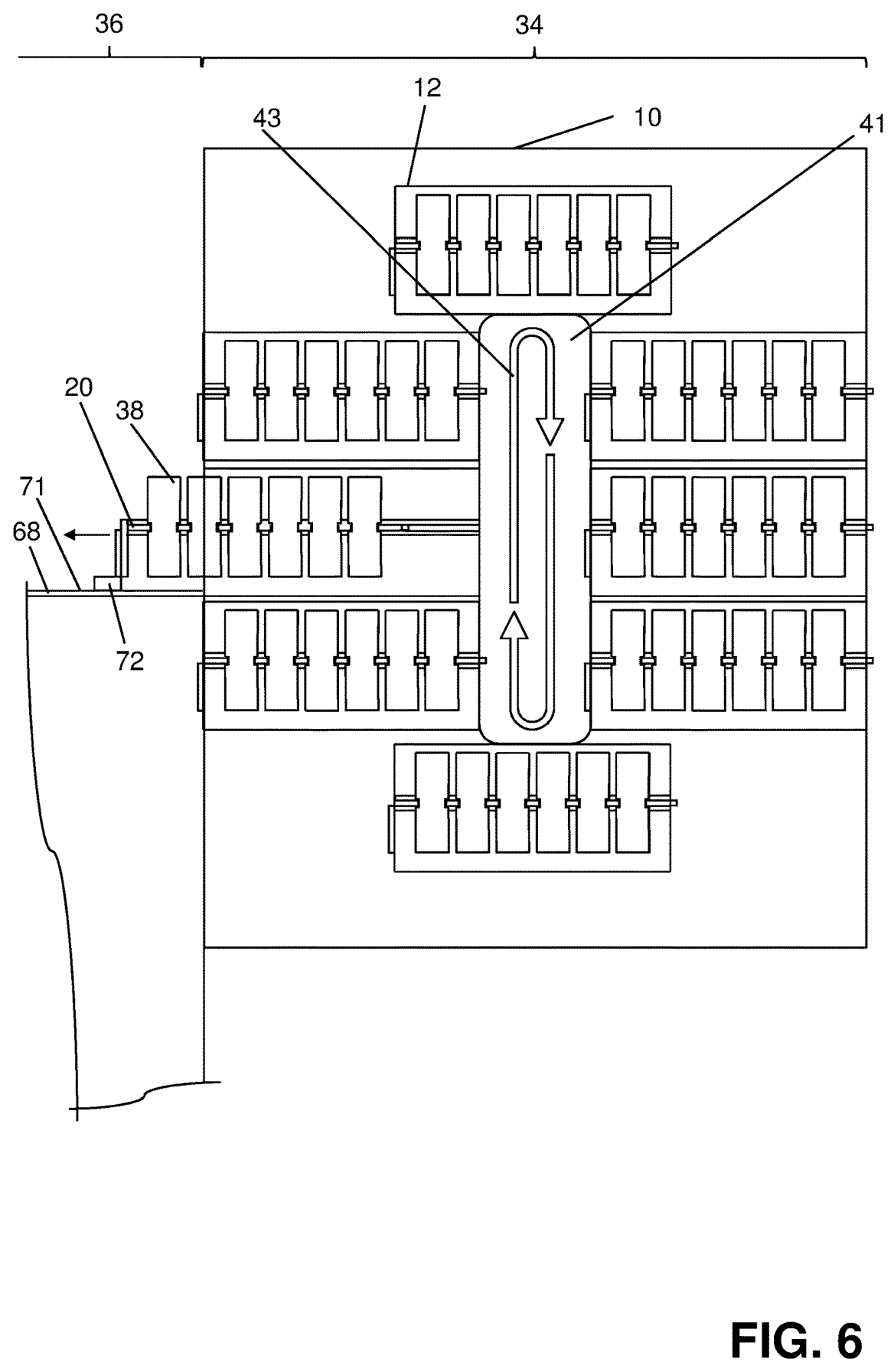

FIG. 6 shows a schematic side view of a further embodiment of a laboratory container storage system (10). The shown laboratory container storage system (10) can comprise eight container storage devices (12). The eight container storage devices (12) can be arranged vertically and/or horizontally spaced relative to each other. The laboratory container storage system (10) can further comprise a circulating device (41). The eight container storage devices (12) can be mounted on the circulating device (41). The circulating device (41) can be configured to circulate horizontally and vertically the eight container storage devices (12) along a circulation path (43). During the circulating movement, the eight container storage devices (12) can remain continuously horizontally aligned. The circulating device (41) can position each of the eight container storage devices (12) relative to the transport surface (71) of a transport system (68) so that a laboratory container (38) can be held in a suspended position above the transport surface (71) when a storage element (20) of a container storage devices (12) is in the second transfer position (36). As shown in FIG. 6, one of the eight container storage devices (12) can be moved by a positioning carrier (72) from the storage position (34) to the second transfer position (36) as indicated by an arrow.

Figures 7A, 7B:
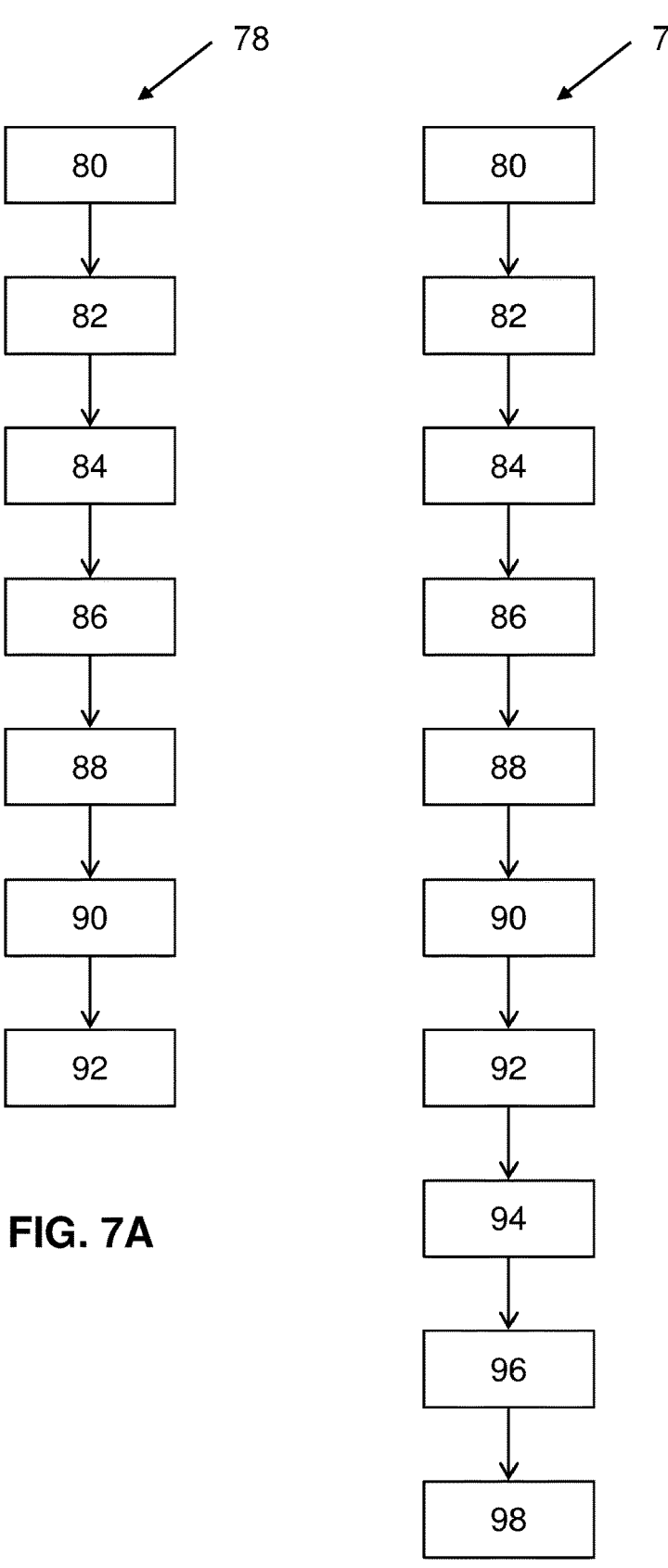
FIGS. 7A-7B illustrate flowcharts of a method of operating the laboratory system according to an embodiment of the present disclosure.

FIGS. 7A-B show flowcharts of two embodiments of a method (78) of operating the laboratory system (62) as described herein. In a first embodiment as shown in FIG. 7A, the storage element (16, 18, 20) can be moved to the first transfer position (32) in a step a) (80) of the method (78). The storage element (16, 18, 20) may be moved manually or by an actuator. Then, the holder (21) of the storage element (16, 18, 20) can be loaded with a laboratory container (38) in step b) (82) of the method (78). Step b) (82) may be executed manually or automated. Subsequently, in step c) (84) of the method (78), the storage element (16, 18, 20) can be moved to the storage position (34). The storage element (16, 18, 20) may be moved manually or by an actuator. In step d) (86) of the method (78), the storage element (16, 18, 20) can be moved to the second transfer position (36) so that the laboratory container (38) can be held in a suspended position above the transport surface (71) of the transport system (68). In this step, the storage element (16, 18, 20) may be moved by a positioning carrier (72), wherein the positioning carrier (72) may be moved by the transport system (68) or the laboratory container carrier (64, 65, 66) may be a self-propelled carrier actively moving on the transport surface (71). Alternatively, the storage element (16, 18, 20) may be moved by an actuator. Then, a laboratory container carrier (64, 65, 66) can be moving under the laboratory container (38) in step e) (88) of the method (78). The laboratory container carrier (64, 65, 66) may be moved by the transport system (68) or the laboratory container carrier (64, 65, 66) may be a self-propelled carrier actively moving under the laboratory container (38). In step f) (90) of the method (78), the laboratory container (38) can be coupled to the laboratory container carrier (64, 65, 66).

When the laboratory container carrier (64, 65, 66) is directly under the laboratory container (38), the laboratory container (38) can be coupled to the laboratory container carrier (64, 65, 66) by a coupling mechanism (39). Finally, the laboratory container carrier (64, 65, 66) can be moving away from the holder (21) and thereby the laboratory container (38) can be released from the holder (21) in step g) (92) of the method (78). The laboratory container carrier (64, 65, 66) may be moved by the transport system (68) or the laboratory container carrier (64, 65, 66) maybe a self-propelled carrier actively moving away from the holder (21).

FIG. 7B shows a second embodiment of the method (78). Steps a) to g) (80, 82, 84, 85, 88, 90, 92) of the second embodiment of the method (78) are the same steps a) to g) (80, 82, 84, 85, 88, 90, 92) as described above for the first embodiment of the method (78). After the laboratory container (38) was released from the holder (21) in step g) (92) of the method (78), the laboratory container carrier (64, 65, 66) may move with the laboratory container (38) along a transportation route on the transport surface (71). For example, the laboratory container carrier (64, 65, 66) may move with the laboratory container (38) from a starting position to a destination position or via one or more intermediate positions between the starting position and the destination position. The starting position and the destination position may be the holder (21) of a storage element (16, 18, 20) in the second transfer position (36). For example, for storing the laboratory container (38) again in the laboratory container storage devices (12). Therefore, in step h) (94) of the method (78), the laboratory container carrier (64, 65, 66) can be moving towards a holder (21) thereby loading the holder (21) of the storage element (16, 18, 20) with the laboratory container (38). The laboratory container carrier (64, 65, 66) may be moved towards the holder (21) by the transport system (68) or the laboratory container carrier (64, 65, 66) can be a self-propelled carrier actively moving towards the holder (21). Subsequently, the laboratory container (38) can be decoupled from the laboratory container carrier (64, 65, 66) in step i) (96) of the method (78), e.g. by further moving the laboratory container carrier (64, 65, 66) in the same direction. Finally, the storage element (16, 18, 20) can be moved to the storage position (34) in step j) (98) of the method (78). The storage element (16, 18, 20) may be moved to the storage position (34) by a positioning carrier (72), wherein the positioning carrier (72) can be moved by the transport system (68) or the positioning carrier (72) can be a self-propelled carrier actively on the transport surface (71). Alternatively, the storage element (16, 18, 20) may be moved to the storage position (34) by an actuator.

Reference throughout the preceding specification to "one embodiment", "an embodiment", "one example" or "an example", means that a particular feature, structure or characteristic described in connection with the embodiment or example can be included in at least one embodiment. Thus, appearances of the phrases "in one embodiment", "in an embodiment", "one example" or "an example", in various places throughout this description are not necessarily all referring to the same embodiment or example.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A laboratory system, the laboratory system comprising:
a laboratory container storage system comprising:
at least one laboratory container; and
at least one laboratory container storage device, wherein each laboratory container storage device comprises:
a frame, and
a storage element comprising a holder receiving and releasing the laboratory container horizontally and holding the laboratory container in a suspended position hanging above a horizontal surface,
wherein each of the at least one laboratory containers comprises a holding portion engaged with and/or disengaged from the holder or coupled to and/or decoupled from the holder,
wherein the storage element is mounted movably on the frame and moves between a first transfer position and a storage position and between the storage position and a second transfer position,
wherein in the first and second transfer positions, the holder is positioned to receive or release the laboratory container horizontally, and
wherein the storage position is located between the first and second transfer positions;
a laboratory container carrier coupled to/decoupled from the laboratory container; and
a transport system comprising a second horizontal surface, wherein the second horizontal surface is a transport surface, wherein the laboratory container carrier moves on the transport surface, wherein the laboratory container storage system is arranged adjacent to the transport system, wherein in the second transfer position, the holder is positioned above the transport surface so that the laboratory container carrier can be positioned below the laboratory container held by the holder for coupling and/or decoupling the held laboratory container.

2. The laboratory system according to claim 1, wherein the holder comprises a horizontal holding slot with two opposing side edges, a rear edge, and an open side, wherein the two opposing side edges hold the laboratory container and the open side receives or releases the laboratory container horizontally.

3. The laboratory system according to claim 2, wherein the storage element comprises multiple of the horizontal holding slots arranged side by side in a straight line.

4. The laboratory system according to claim 2, wherein the at least one laboratory containers comprise a bottom and a first horizontal cross section which is at a first height from the bottom, wherein the holding portion comprises a second horizontal cross section which is at a second height from the bottom, wherein the first height is larger than the second height, wherein the width of the first horizontal cross section is larger than the distance between the two opposing side edges, and wherein the width of the second horizontal cross section is the same or smaller than the distance between the two opposing side edges.

5. The laboratory system according to claim 1, wherein each of the at least one laboratory devices comprises multiple storage elements according to claim 1 arranged side by side in parallel and movably mounted on the frame and wherein each storage element can be moved individually.

6. The laboratory system according to claim 1, further comprising,
at least two laboratory container storage devices according to claim 1, wherein the at least two laboratory container storage devices are arranged vertically spaced relative to each other; and
an elevating device, wherein the at least two laboratory container storage devices are mounted on the elevating device, wherein the elevating device moves the at least two laboratory container storage devices up and down along a vertical axis, and wherein the at least two laboratory container storage devices remain continuously horizontally aligned during the up and down movement.

7. The laboratory system according to claim 1, further comprising,
at least two of the laboratory container storage devices, wherein the at least two of the laboratory container storage devices are arranged vertically and/or horizontally spaced relative to each other; and
a circulating device, wherein the at least two laboratory container storage devices are mounted on the circulating device, wherein the circulating device circulates horizontally and vertically the at least two laboratory container storage devices along a circulation path and wherein the at least two laboratory container storage devices remain continuously horizontally aligned during the circulating movement.

8. The laboratory system according to claim 1, wherein the laboratory container and the laboratory container carrier comprise a coupling mechanism coupling the laboratory container to the laboratory container carrier and decoupling the laboratory container from the laboratory container carrier.

9. The laboratory system according to claim 1, further comprising,
a positioning carrier, wherein the positioning carrier and the storage element comprise a further coupling mechanism, wherein the positioning carrier is coupled to/decoupled from the storage element or engaged with/disengaged from the storage element, and
wherein the positioning carrier moves the storage element between the storage position and the second transfer position.

10. The laboratory system according to claim 9, further comprising,
a control unit communicatively connected to the laboratory container storage system and the transport system, wherein the control unit controls the movement of the storage element between the first transfer position and the storage position and between the storage position and the second transfer position, and wherein the control unit controls the movement of the laboratory container carrier on the transport surface.

11. The laboratory system according to claim 10, wherein the control unit controls the movement of the positioning carrier.

12. The laboratory system according to claim 1, wherein the holder holds the laboratory container directly.

13. The laboratory system according to claim 1 and further comprising a housing, and the storage position is located within the housing between the first and second transfer positions.

14. The laboratory system according to claim 1, wherein the holder moves in opposite directions from the storage position to the first transfer position and to the second transfer position.

15. The laboratory system of claim 1 and further comprising one or more guiding elements guiding movement of the storage element between the first transfer position and the storage position, and between the storage position and the second transfer position.

16. The laboratory system of claim 1 and further comprising one or more actuators moving the storage elements between the first transfer position and the storage position, and between the storage position and the second transfer position.

17. The laboratory system of claim 1 in which for each of the first transfer position, the storage position, and the second transfer position, the laboratory container having a position coupled with the holder, and a position moved away and released from the holder.

18. The laboratory system of claim 1 in which each laboratory container has a held position with the holder of the storage element being in direct contact with and engaged and/or coupled with the holder.

19. The laboratory system according to claim 18, wherein the holder comprises a horizontal holding slot with two opposing side edges, a rear edge, and an open side, wherein the two opposing side edges hold the laboratory container and the open side receives or releases the laboratory container horizontally.

20. The laboratory system according to claim 1 in which each holder comprises a holding slot.

21. The laboratory system according to claim 20 in which each laboratory container comprises the holding portion received in the slot.

22. The laboratory system according to claim 1, the holder and the holding portion of the laboratory container defining a coupling mechanism having a coupled condition with the holding portion directly coupled with the holder, and an uncoupled condition with the holding portion uncoupled from the holder.

23. A method of operating the laboratory system according to claim 9, the method comprising:

a) moving the storage element to the first transfer position;

b) loading the holder of the storage element with the laboratory container;

c) moving the storage element to the storage position;

d) moving the storage element to the second transfer position so that the laboratory container is held in a suspended position above the transport surface;

e) moving the laboratory container carrier under the laboratory container;

f) coupling the laboratory container to the laboratory container carrier; and g) moving the laboratory container carrier away from the holder and releasing the laboratory container from the holder.

24. The method according to claim 23, further comprising, h) moving the laboratory container carrier towards the holder to load the holder of the storage element with the laboratory container;

i) decoupling the laboratory container from the laboratory container carrier; and j) moving the storage element to the storage position.

* * * * *